United States Patent
Islam et al.

(10) Patent No.: US 11,888,592 B2
(45) Date of Patent: Jan. 30, 2024

(54) UE CONFIGURED FOR MULTIPLEXING HARQ-ACK BITS OF DIFFERENT PRIORITIES IN A PUCCH TRANSMISSION

(71) Applicant: Intel Corporation, Santa Clara, CA (US)

(72) Inventors: Toufiqul Islam, Santa Clara, CA (US); Salvatore Talarico, Los Gatos, CA (US); Debdeep Chatterjee, San Jose, CA (US); Sergey Panteleev, Nizhny Novgorod (RU); Yongjun Kwak, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 17/243,773

(22) Filed: Apr. 29, 2021

(65) Prior Publication Data

US 2021/0250134 A1 Aug. 12, 2021

(51) Int. Cl.
| | | |
|---|---|---|
| *H04W 72/04* | (2023.01) | |
| *H04L 1/1812* | (2023.01) | |
| *H04L 1/1867* | (2023.01) | |
| *H04B 7/06* | (2006.01) | |
| *H04B 7/0456* | (2017.01) | |

(Continued)

(52) U.S. Cl.
CPC ......... *H04L 1/1819* (2013.01); *H04B 7/0456* (2013.01); *H04B 7/0626* (2013.01); *H04L 1/1896* (2013.01); *H04W 72/21* (2023.01); *H04W 72/56* (2023.01)

(58) Field of Classification Search
CPC ... H04L 1/1819; H04L 1/1896; H04L 1/1864; H04L 1/1861; H04B 7/0456; H04B 7/0626; H04W 72/21; H04W 72/56
See application file for complete search history.

(56) References Cited

U.S. PATENT DOCUMENTS

| | | | |
|---|---|---|---|
| 2020/0137695 A1* | 4/2020 | Papasakellariou | .... H04W 52/08 |
| 2020/0259625 A1* | 8/2020 | Papasakellariou | ... H04B 7/0626 |

(Continued)

OTHER PUBLICATIONS

R1-2000920, NTT DOCOMO, Discussion on the priority index for the HARQ-ACK codebook, 3GPP TSG RAN WG1 #100, e-Meeting, Feb. 24-Mar. 6, 2020 (Year: 2020).*

*Primary Examiner* — Mahbubul Bar Chowdhury
(74) *Attorney, Agent, or Firm* — Schwegman Lundberg & Woessner, P.A.

(57) ABSTRACT

A user equipment (LTE) for operation in a fifth-generation system (5GS) is configured to decode configuration information for a first hybrid-automatic repeat request (HARQ) acknowledgement (ACK) (HARQ-ACK) codebook for first priority HARQ-ACK bits and for a second HARQ-ACK codebook for second priority HARQ-ACK bits. The configuration information may indicate a physical uplink control channel (PUCCH) resource for the first HARQ-ACK codebook and a PUCCH resource for the second HARQ-ACK codebook. The UE may multiplex the first priority HARQ-ACK bits and the second priority HARQ-ACK bits in a PUCCH transmission when the PUCCH resources for the first and the second HARQ-ACK codebooks overlap. The LTE may use the PUCCH resource for the higher priority HARQ-ACK bits to multiplex the first priority HARQ-ACK bits and the second priority HARQ-ACK bits.

25 Claims, 5 Drawing Sheets

(51) Int. Cl.
*H04W 72/21* (2023.01)
*H04W 72/56* (2023.01)

(56) References Cited

U.S. PATENT DOCUMENTS

| | | | |
|---|---|---|---|
| 2021/0218504 A1* | 7/2021 | Wang | H04W 72/1273 |
| 2022/0183025 A1* | 6/2022 | Fröberg Olsson | H04L 1/0042 |
| 2022/0256554 A1* | 8/2022 | Chen | H04W 72/23 |
| 2022/0361199 A1* | 11/2022 | Yin | H04L 27/2605 |
| 2022/0369349 A1* | 11/2022 | Lee | H04W 72/569 |
| 2023/0064087 A1* | 3/2023 | Yin | H04L 1/1854 |
| 2023/0077055 A1* | 3/2023 | Gou | H04L 5/0055 |
| 2023/0094455 A1* | 3/2023 | Li | H04L 1/1861 370/329 |
| 2023/0123957 A1* | 4/2023 | Jung | H04L 1/08 370/329 |

* cited by examiner

UE CONFIGURED FOR MULTIPLEXING HARQ-ACK BITS OF DIFFERENT PRIORITIES IN A PUCCH TRANSMISSION

PRIORITY CLAIM

This application claims the benefit of priority under 35 U.S.C. 119(e) to U.S. Provisional Patent Application Ser. No. 63/019,059, filed May 1, 2020, and to U.S. Provisional Patent Application Ser. No. 63/063,107, filed. Aug. 7, 2020, which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to prioritization or multiplexing of UL control and control or data transmissions for different services. Some embodiments relate to multiplexing lower and higher priority HARQ-ACK bits in a PDCCH transmission.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modem society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP UTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

DETAILED DESCRIPTION

Figure 1A:
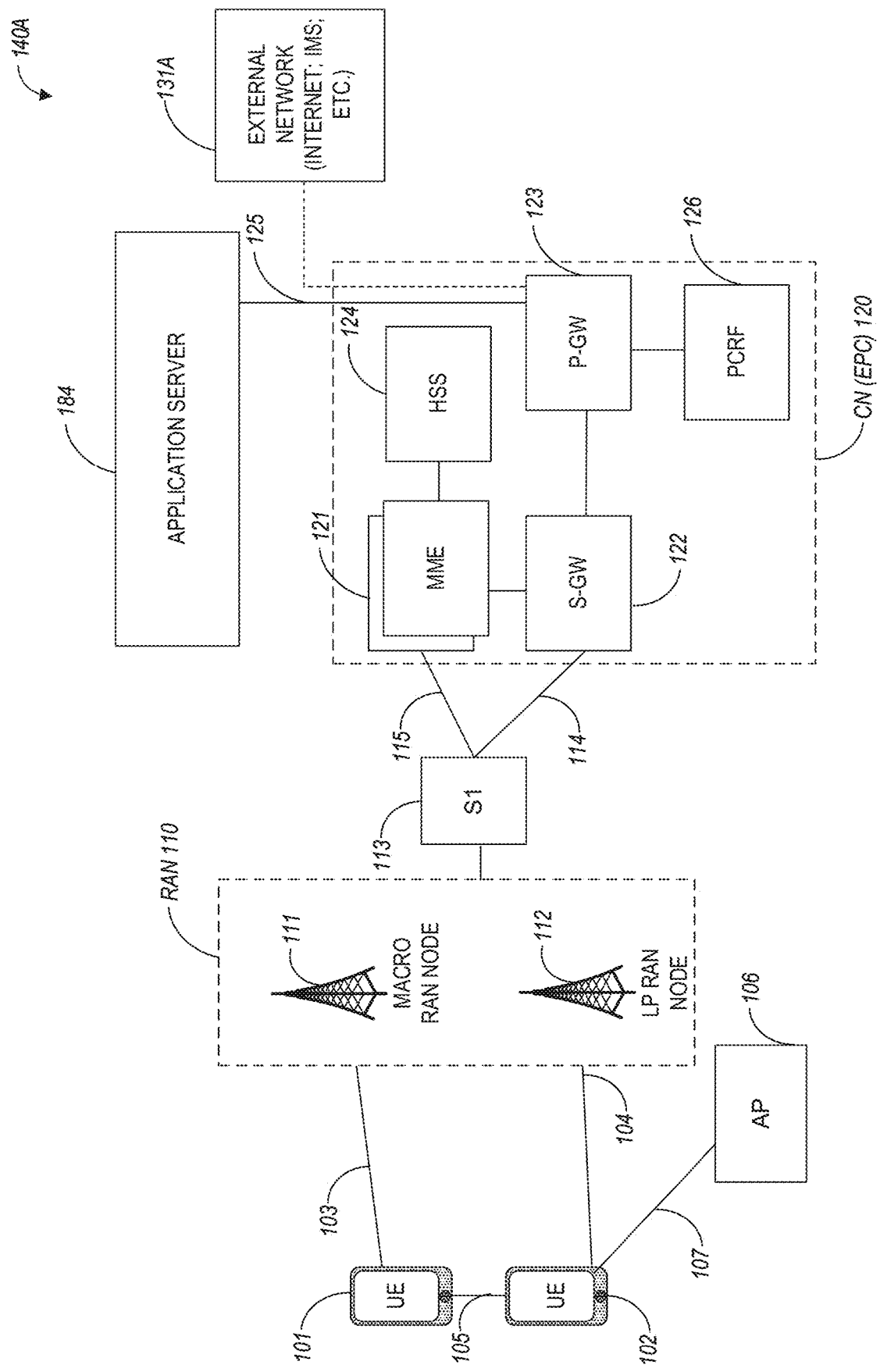
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a user equipment (UE) configured for operation in a fifth-generation system (5GS). In these embodiments, the UE is configured to decode configuration information to configure the UE with a first hybrid-automatic repeat request (HARQ) acknowledgement (ACK) (HARQ-ACK) codebook for first priority HARQ-ACK bits and configure the UE with a second HARQ-ACK codebook for second priority HARQ-ACK bits. The configuration information may indicate a physical uplink control channel (PUCCH) resource for the first HARQ-ACK codebook and a PUCCH resource for the second HARQ-ACK codebook. In these embodiments, the UE may multiplex the first priority HARQ-ACK bits and the second priority HARQ-ACK bits in a PUCCH transmission when the PUCCH resources for the first and the second HARQ-ACK codebooks overlap. In these embodiments, the LE may use the PUCCH resource for the higher priority HARQ-ACK bits to multiplex the first priority HARQ-ACK bits and the second priority HARQ-ACK bits. For example, the UE may use the PUCCH resource for the second HARQ-ACK codebook to multiplex the first priority HARQ-ACK bits and the second priority HARQ-ACK bits when the second priority is a higher priority than the first priority. For example, the UE may use the PUCCH resource for the first HARQ-ACK codebook to multiplex the first and second priority HARQ-ACK bits when the first priority is a higher priority than the second priority.

In some embodiments, the first priority is a low priority (LP) and the second priority is a high priority (HP). In these embodiments, the UE may use the PUCCH resource for the second HARQ-ACK codebook to multiplex the LP HARQ-ACK bits and the HP HARQ-ACK bits since the second priority is a higher priority than the first priority.

In some embodiments, the configuration information may include a priority index '0' to indicate the first priority (e.g., the low priority) and a priority index of '1' to indicate the second priority (e.g., high priority). In these embodiments, the first priority may be a lower priority than the second priority, and the second priority may be a higher priority than the first priority, although the scope of the embodiments is not limited in this respect.

In some embodiments, when the PUCCH resource for the first HARQ-ACK codebook overlaps with the PUCCH resource for the second HARQ-ACK codebook, the UE may separately encode the first priority HARQ-ACK bits and the second priority HARQ-ACK bits for multiplexing in the PUCCH resource for the second priority HARQ-ACK bits when the second priority is a higher priority than the first priority. In these embodiments, when the PUCCH resource for the first HARQ-ACK codebook does not overlap with the PUCCH resource for the second. HARQ-ACK codebook, the UE may refrain from multiplexing the first priority HARQ-ACK bits and the second priority HARQ-ACK bits in any of the PUCCH resources.

In these embodiments, when the PUCCH resources for the first and the second HARQ-ACK codebook do not overlap, the UE may encode the first priority HARQ-ACK bits for transmission in the PUCCH resource for the first priority HARQ-ACK bits and configured to encode the second priority HARQ-ACK bits for transmission in the PUCCH resource for the second priority HARQ-ACK bits.

In some embodiments, the first priority HARQ-ACK bits are generated by the UE from decoding a first physical downlink shared channel (PDSCH), and the second priority HARQ-ACK bits are generated by the UE from decoding a second PDSCH.

In some embodiments, when the PUCCH resource for the first HARQ-ACK codebook overlaps with the PUCCH resource for the second HARQ-ACK codebook, to multiplex the first priority HARQ-ACK bits and the second priority HARQ-ACK bits when the second priority is a higher priority than the first priority, the UE may encode the first priority HARQ-ACK bits for transmission in a first portion of the PUCCH resource for the second priority HARQ-ACK bits and encode the second priority HARQ-ACK bits for transmission in a second portion of the PUCCH resource for the second priority HARQ-ACK bits.

Figure 3:
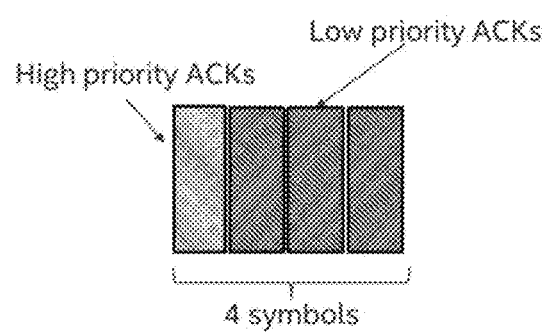
FIG. 3 illustrates separately encoding and mapping of low and high priority HARQ-ACK bits to different resources in a PUCCH transmission in accordance with some embodiments.

In some embodiments, the first portion of the PUCCH resource for the second priority HARQ-ACK bits comprises a first group of one or more symbols and the second portion of the PUCCH resource comprises a second group of one or more symbols. In these embodiments, the first group of one or more symbols precedes the second group of one or more symbols in the PUCCH resource for the second priority HARQ-ACK bits. An example of these embodiments is illustrated in FIG. 3, described in more detail below.

In some embodiments, the IE may determine a number of symbols for the PUCCH resource for the first HARQ-ACK codebook from the configuration information and may determine a number of symbols for the PUCCH resource for the second HARQ-ACK codebook from the configuration information.

In some embodiments, the number of symbols for the PUCCH resource for the first HARQ-ACK codebook may be based on the priority level of the first priority HARQ-ACK bits and the number of symbols for the PUCCH resource for the second HARQ-ACK codebook may be based on the priority level of the second priority HARQ-ACK bits. In these embodiments, the higher priority HARQ-ACK bits may be allocated a greater number of symbols, although the scope of the embodiments is not limited in this respect.

In some embodiments, the UE may determine a number of symbols of the PUCCH resource for the first priority HARQ-ACK bits and number of symbols of the PUCCH resource for transmission of the second priority HARQ-ACK bits are based on a maximum code rate for the PUCCH transmission.

In some embodiments, the LI may decode a downlink (DL) scheduling downlink control information (DCI) format (i.e., providing a downlink (DL) scheduling grant). In these embodiments, the DCI format may include a field to indicate whether to enable or disable HARQ-ACK codebook multiplexing.

In these embodiments, a UE may be configured with two codebooks and the codebooks may be configured and/or associated with a different priority. An indication of which codebook to use can be conveyed by an explicit indication in a field in a DCI format providing DL scheduling grant. For SPS-PDSCH, codebook identification can be provided by higher layer signaling. In these embodiments, multiplexing HARQ-ACK bits based on two HARQ-ACK codebooks and multiplexing two HARQ-ACK codebooks maybe used interchangeably and have similar meaning.

In some embodiments, the UE may decode radio-resource control (RRC) signalling to configure the UE to either enable or disable multiplexing HARQ-ACK bits of different priorities. In these embodiments, when the multiplexing HARQ-ACK bits of different priorities is disabled (or has not been configured) and when the LE is configured with the HARQ-ACK codebook for first priority HARQ-ACK bits and configured with the second HARQ-ACK codebook for second priority HARQ-ACK bit, the UE may drop the lower priority HARQ-ACK bits.

In some embodiments, when a PUCCH resource for high priority (HP) HARQ-ACK bits overlap with a PUCCH resource for a channel state information (CSI) transmission, the UI; may drop the CSI transmission. In these embodiments, when a PUCCH resource for low priority (LP) HARQ-ACK bits overlap with the PUCCH resources for the CSI transmission, the UI; may multiplex the LP HARQ-ACK bits and the CSI transmission on the overlapping PUCCH resource.

In some embodiments, two maximum code rates are configured for multiplexing low priority and high priority HARQ-ACK bits into resource elements (REs) within the PUCCH resource for the second HARQ-ACK codebook when the second priority is the high priority.

Some embodiments are directed to a non-transitory computer-readable storage medium that stores instructions for execution by processing circuitry of a user equipment (UE) configured for operation in a fifth-generation system (5GS).

Some embodiments are directed to a generation node B (gNB) configured for operation in a fifth-generation system (5GS). In these embodiments, the gNB may encode configuration information to configure a user equipment (LIE) with a first hybrid-automatic repeat request (HARQ) acknowledgement (ACK) (HARQ-ACK) codebook for first priority HARQ-ACK bits and configure the UE with a second HARQ-ACK codebook for second priority HARQ-ACK bits. In these embodiments, the configuration information may be encoded to indicate a physical uplink control channel (PUCCH) resource for the first HARQ-ACK codebook and a PUCCH resource for the second HARQ-ACK codebook. In these embodiments, the gNB may decode a PUCCH transmission from the UE that includes the first priority HARQ-ACK bits multiplexed with the second priority HARQ-ACK bits when the PUCCH resources for the first and the second HARQ-ACK codebooks overlap. In these embodiments, the PUCCH transmission may be received on the PUCCH resource for the second HARQ-ACK codebook when the second priority is a higher priority than the first priority.

In some embodiments, when the PUCCH resources for the first and the second HARQ-ACK codebooks do not overlap, the gNB may decode the first priority HARQ-ACK bits in the PUCCH resource for the first priority HARQ-ACK bits and may decode the second priority HARQ-ACK bits in the PUCCH resource for the second priority HARQ-ACK bits.

FIG. 1A illustrates an architecture of a network in accordance with some embodiments. The network 140A is shown to include user equipment WE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively, referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for LT such as mobile telephones. In LTE-Advanced and various wireless systems, carrier aggregation is a technology according to which multiple carrier signals operating on different frequencies may be used to carry, communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GEL and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP MR (New Radio) by allocating the OFDM carrier data bit vectors to the corresponding symbol resources.

In some embodiments, any of the UEs 101 and 102 can comprise an Internet-of-Things (IoT) LIE or a Cellular IoT (CIoT) UE, which can comprise a network access layer designed for low-power IoT applications utilizing short-lived LIE connections. In some embodiments, any of the UEs 101 and 102 can include a narrowband (NB) IoT UE (e.g., such as an enhanced NB-IoT (eNB-IoT) UE and further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110, The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The LIE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 11 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
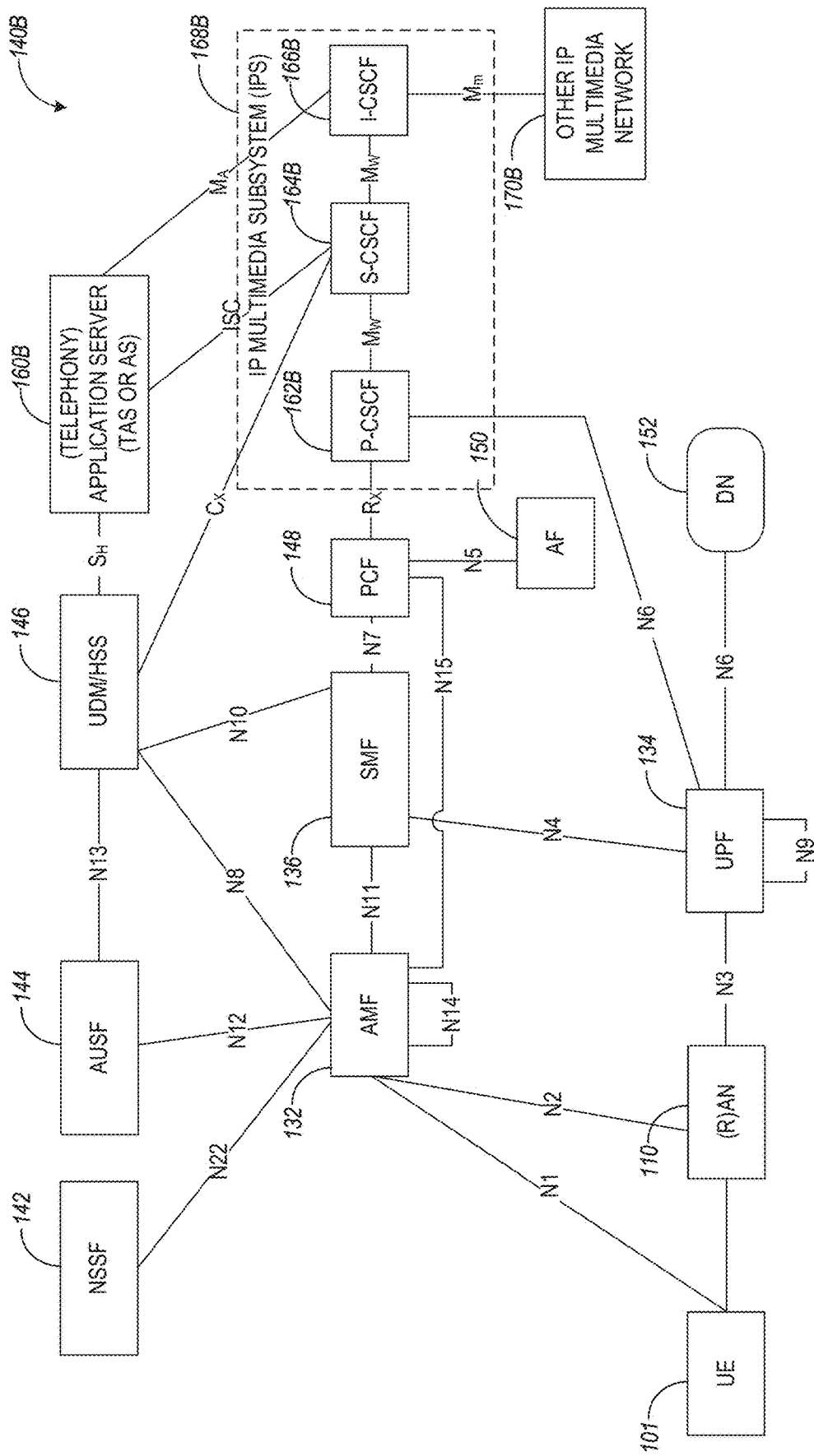
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
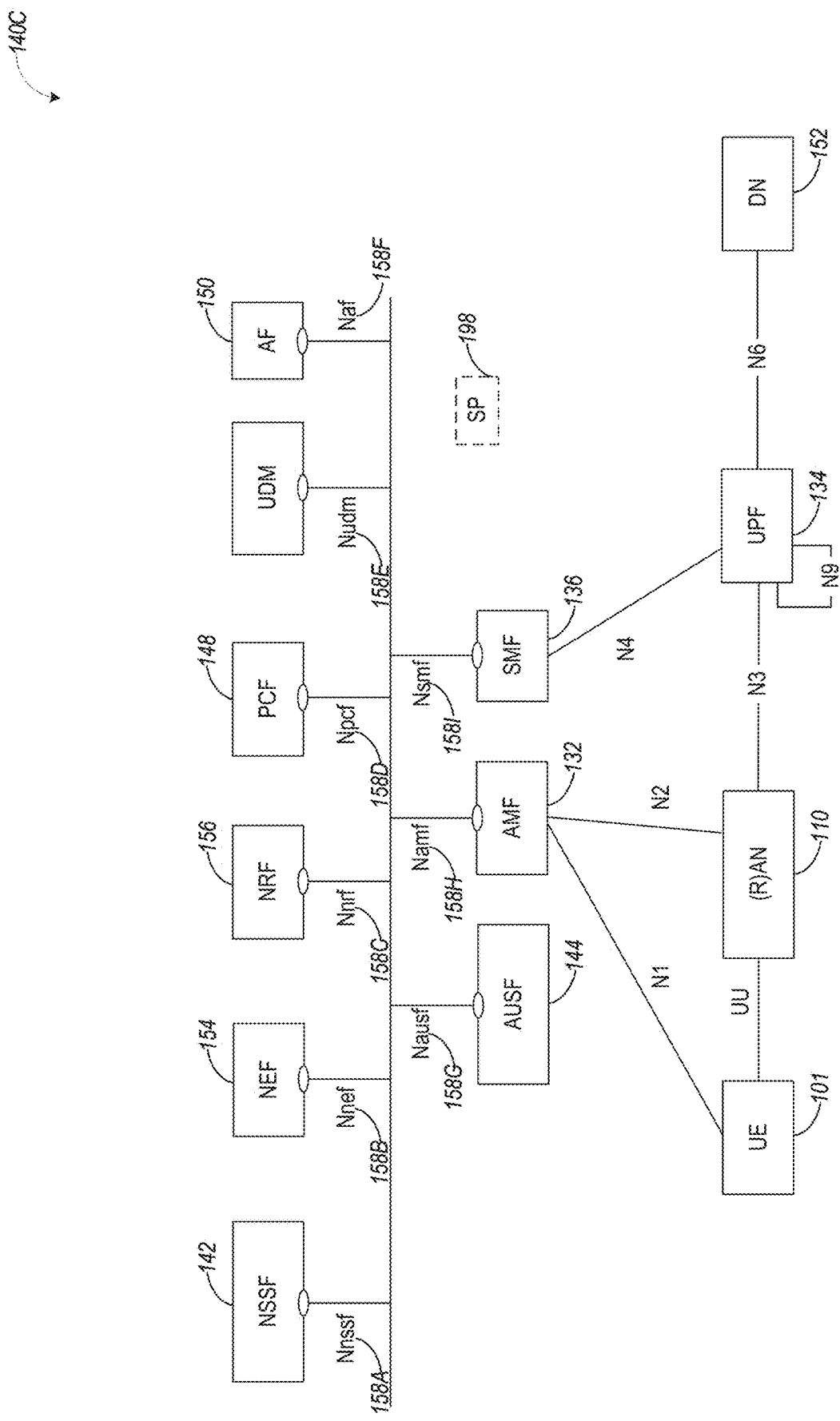

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Different services may be supported in a carrier or serving cell. NR UE may support one or more service types. If communication of more than one service type with varying reliability and latency requirements can be made in a carrier/serving cell, it is possible that scheduled/configured resource for transmission of a first service type may overlap with resource for transmission of a second service type for a given UE. In order to handle collision and prioritize more urgent transmission, Rel16 specifications allow for scheduling or configuring resource for a transmission of either high or low priority where the priority level is indicated to the UE. A configured UE may transmit 'high' priority transmission and drop the 'low' priority transmission in UL in case of an overlap. However, always dropping 'low' priority transmission may be quite detrimental for spectral efficiency and UE perceived throughput for the 'low' priority transmission which may potentially carry high payload control information of one or multiple carrier. Hence, solution is necessary for efficient multiplexing of UL transmissions of 'high' and 'low' priority for a given UE which may provide better flexibility in resource management without sacrificing QoS requirements for either service types much. This disclosure focuses on multiplexing of high and low priority HARQ-ACK bits.

Mechanisms are described for multiplexing low and high priority HARQ-ACK bits, which may enhance system spectral efficiency and scheduling flexibility.

The examples/embodiments below consider multiplexing of HARQ-ACKs of different priority. In particular, we focus on multiplexing of one or more HARQ-ACKs based on a first codebook and one or more HARQ-ACKs based on a second codebook, where first codebook is associated with high priority and second codebook is associated with low priority and for the two codebooks, following options are possible:

one is slot-based, and one is sub-slot-based.
Both are slot-based.
Both are sub-slot-based Here, slot or sub-slot based implies PUCCH resource for HARQ transmission based on a codebook that spans a slot or sub-lot, respectively. For a given numerology, slot occupies 14 symbols where a sub-slot duration is less than a slot, e.g., can be within 1 symbol to 13 symbols. A sub-slot may or may not cross slot boundary.

A UE may be configured with one or more PUCCH resource sets for transmission of HARQ-ACK information, where each PUCCH resource set includes a number of PUCCH resources, e.g., 16, where each resource corresponding to a PUCCH format, a first symbol, a duration, a PRB offset $RB_{BWP}^{offset}$, and a cyclic shift index set for a PUCCH transmission. Depending on payload of HARQ-ACK information, a suitable PUCCH resource set is identified. Reed-muller or Polar codes can be used for multiplexed HARQ-ACK transmission. Choice of channel code maybe predefined based on payload (such as up to 11 bits, Reed-muller codes used) or can be dynamically signaled or semi-statically configured if UE supports the capability.

Here, it is assumed that if a UE is configured with two codebooks, codebooks are configured/associated with different priority. For example, if first (second) codebook is indicated for use of HARQ-ACK transmission, it is assumed of priority index 0, e.g., low priority (priority index 1, e.g., high priority). Indication of which codebook to use can be conveyed by an explicit indication in a field in a DCI format providing DL scheduling grant. For SPS-PDSCH, codebook identification can be provided by higher layer signaling. Below, multiplexing HARQ-ACKs based on two HARQ-ACK codebooks and multiplexing two HARQ-ACK codebooks maybe used interchangeably and have similar meaning.

UE may report capability that UE supports multiplexing of different UCI types of different priorities onto PUCCH. Higher layer configuration can be provided to UE to enable one or more of the following multiplexing and/or dropping behaviors.

Discussed embodiments can apply to any duplexing system such as FDD, TDD, licensed or unlicensed operation, carrier aggregation/dual connectivity scenarios unless mentioned otherwise.

UE Capability and Higher Layer Configuration to Enable Multiplexing

In one embodiment, UE may indicate capability to network/gNB for multiplexing two HARQ-ACK codebooks of different priorities. In one example, UE may be configured by a higher layer signaling/parameter to allow multiplexing of two HARQ-ACK codebooks of different priorities. In other words, if the higher layer parameter is provided, UE would multiplex if timelines conditions are met, otherwise UE would not multiplex and transmit the HARQ-ACK(s) based on the codebook associated with 'high' priority only and drop the HARQ-ACKs based on the codebook associated with 'low' priority. Alternatively, DL scheduling DCI may include an indication to enable or disable multiplexing. For example, DL scheduling DCI causing the high priority HARQ-ACK transmission may include an indication whether it is to be multiplexed with low priority HARQ-ACK if applicable. The field for this indication in DCI may only be present if UE is configured with two codebooks.

Figure 2:
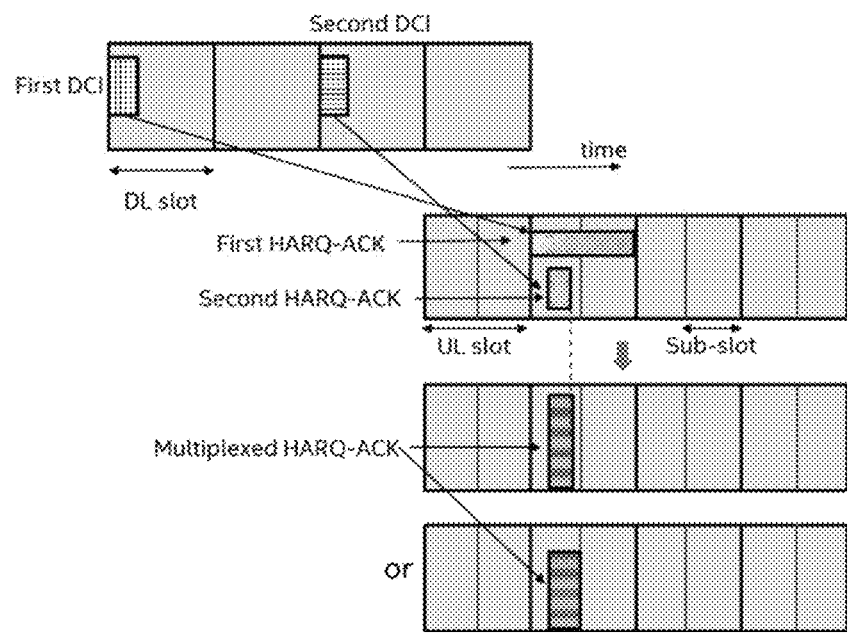
FIG. 2 illustrates multiplexing low and high priority HARQ-ACKs in a resource based on the PUCCH configuration of high priority HARQ-ACK, in accordance with some embodiments.

Determination/Configuration of PUCCH Resource for Carrying Multiplexed HARQ-ACKs In one embodiment, if the UE is configured to multiplex HARQ-ACKs based on two codebooks of different priority, the resultant PUCCH resource for carrying the multiplexed HARQ-ACKs is obtained based on the configuration of the codebook of 'high' priority. In one example, if the PUCCH resource of second codebook is sub-slot based, which is considered as "high priority", the resultant PUCCH resource which would multiplex two HARQ-ACK codebooks, will be sub-slot based. In another example, the resultant PUCCH resource would be no later than the original (e.g., prior to multiplexing) PUCCH resource of the HARQ-ACK(s) based on second codebook. In another example, the resultant PUCCH resource would be no later than the end of sub-slot or slot boundary where original PUCCH resource for HARQ-ACK based on second codebook was. FIG. 2 shows an example, where first DCI caused the first HARQ-ACK transmission which is slot based and second DCI caused the second HARQ-ACK transmission which is sub-slot based, where the considered slot and sub-slot overlaps. The resultant PUCCH resource is based on the sub-slot based resource configuration of second HARQ-ACK and may end where original PUCCH resource for second HARQ ends or by the end of sub-slot boundary. In one example, it is configured by higher layer signaling whether resultant PUCCH resource will be based on PUCCH configuration of first or second codebook. Or a DCI which schedules the PDSCH corresponding to the second HARQ-ACK includes an indication whether its PUCCH resource configuration would be used for multiplexing. As an extension to the example, PUCCH configuration, provided by higher layer signaling, of first or second codebook may have a parameter, which if present, indicates the UE which PUCCH configuration, including PUCCH resource and PUCCH formats, to assume for transmitting the multiplexed HARQ-ACKs. In an example, only PUCCH formats 2, 3, 4 may be used for multiplexing the HARQ-ACKs.

In another embodiment, if the UE is configured to multiplex HARQ-ACKs based on two codebooks of different priority, the resultant PUCCH resource for carrying the multiplexed HARQ-ACKs is obtained based on the configuration of the codebook that is dynamic, which is Type-2 HARQ-ACK codebook in NR design. Here, 'dynamic' refers to the feature of the codebook which can have a varying payload size of HARQ-ACK bits. If both the codebooks are configured as dynamic, then the configuration of the codebook of 'high' priority maybe used for identifying PUCCH resource of the multiplexed HARQ-ACKs.

In one embodiment, with reference to slots or sub-slots (e.g., if HARQ-ACK transmission according to a codebook is configured to be sub-slot based) for PUCCH transmissions for the multiplexed HARQ-ACKs based on two codebooks of different priority, if the UE detects a DCI format (such as DCI format 1_1 or 1_2) scheduling (activating) a PDSCH (SPS PDSCH release) reception ending in slot n (or sub-slot m of slot n) where the HARQ-ACK associated with the PDSCH belongs to a codebook of 'high' priority (e.g., if the DCI format indicates priority index 1, e.g., high priority, or for SPS PDSCH, if SPS PDSCH configuration includes priority index 1, e.g., high priority), the UE provides the multiplexed HARQ-ACK information in a PUCCH transmission within slot n+k (sub-slot m+k in slot j≥n), where k is a number of slots (sub-slots) and is indicated by the PDSCH-to-HARQ_feedback timing indicator field in the DCI format, if present, or provided by a higher layer parameter such as dl-DataToUL-ACK.

In another embodiment, for a PUCCH with the multiplexed HARQ-ACK information comprising two codebooks, a UE determines a PUCCH resource after determining a set of PUCCH resources for the total number of multiplexed HARQ-ACK information bits, based on the PUCCH configuration associated with the codebook with priority index 1 (e.g., high priority) or based on the PUCCH configuration associated with the codebook that was indicated in the last DCI format, among the DCI formats that have caused the generation of HARQ-ACKs that are to be multiplexed. In one example, the PUCCH resource determination is based on the PUCCH resource indicator field, if present, in the last DCI format or the DCI format scheduling PDSCH or activating SPS PDSCH release where the codebook indicated for HARQ-ACK transmission is of priority index 1 or high priority, among the DCI formats detected by UE that have a value of a PDSCH-to-HARQ_feedback timing indicator field, if present, or a value provided by higher layer signaling such as dl-DaaToUL-ACK, indicating a same slot or same sub-slot or overlapping slot and sub-slot for the PUCCH transmission. In one example, for PUCCH resource determination based on last DCI format or the DCI format scheduling PDSCH or activating SPS PDSCH release where the codebook indicated for HARQ-ACK transmission is of priority index 1 or high priority, the detected DCI formats are first indexed in an ascending order across serving cells indexes for a same PDCCH monitoring occasion and are then indexed in an ascending order across PDCCH monitoring occasion indexes.

In one embodiment, if first and second PUCCH resources (e.g., either indicated or configured) of HARQ-ACK(s)

belonging to first and second codebooks overlap and at least one of the first or second resources overlap with UL control information for configured grant transmission in UL (CG-UCI) in a PUCCH or in a PUSCH in a slot or sub-slot, In one example, if CG-UCI is in a PUSCH, CG-UCI may be dropped, and multiplexed HARQ-ACKs of two codebooks are transmitted in a PUCCH resource based on configuration of second codebook In another example, if CG-UCI is in a PUSCH, CG-UCI and HARQ-ACKs based on second codebook are multiplexed in the PUSCH when second PUCCH resource overlaps with PUSCH, and HARQ-ACKs of first codebook is dropped In another example, if CG-UCI is in a PUSCH, CG-UCI and all HARQ-ACKs bits of both codebooks are multiplexed in the PUSCH.

In one example, if CG-UCI is in a PUCCH, CG-UCI may be dropped, and multiplexed HARQ-ACKs of two codebooks are transmitted in a PUCCH resource based on configuration of second codebook In another example, if CG-UCI is in a PUCCH, CG-UCI and HARQ-ACKs based on second codebook are multiplexed in a third PUCCH resource when second PUCCH resource overlaps with configured/indicated PUCCH resource of CG-UCI, and HARQ-ACKs of first codebook is dropped. Third PUCCH resource may be based on configuration of second codebook In another example, if CG-UCI is in a PUCCH, CG-UCI and all HARQ-ACKs bits of both codebooks are multiplexed in a third PUCCH resource, where third PUCCH resource may be based on configuration of second codebook Construction of multiplexed HARQ-ACK bits
Concatenation in Bit Domain In an embodiment, $O_{ACK,low}$ and $O_{ACK,high}$ HARQ-ACK bits corresponding to low and high priority codebooks are concatenated in bit domain before encoding according to PUCCH format (PF) 2, 3, or 4. For larger payload sizes, CRC is added. The control information (after CRC attachment, e.g., $O_{CRC}$ bits) to be transmitted is encoded, using Reed Muller codes for payloads up to 11 bits and Polar coding for larger than 11 bits, followed by scrambling and QPSK modulation. The scrambling sequence is based on the device identity (the C-RNTI) together with the physical-layer cell identity (or a configurable virtual cell identity).

The bits corresponding to two codebooks will be multiplexed subject to a resource constraint such as a PUCCH resource for use with PF 2, 3, or 4 may include $M_{RB}^{PUCCH}$ PRBs and a configurable maximum code rate r. For example, if $(O_{ACK,low}+O_{ACK,high}+O_{CRC}) \leq (M_{RB}^{PUCCH} N_{SC,ctrl}^{RB} N_{symb}^{PUCCH} Q_m r)_j$ is satisfied for a given PUCCH resource j for some PFs such as 2, 3, and 4, resource j maybe used for transmission of the multiplexed HARQ-ACKs. Here, $N_{SC,ctrl}^{RB}$ and $N_{symb}^{PUCCH}$ refer to the number of subcarriers in a PRB and number of PUCCH symbols used for control information transmission, $Q_m-1$ if pi/2-BPSK is the modulation scheme and $Q_m=2$ if QPSK is the modulation scheme as indicated by pi2BPSK for PUCCH format 3 or PUCCH format 4. For PUCCH format 2, $Q_m=2$. If not satisfied, then UE checks for PUCCH resource i≠j to identify whether total payload can be transmitted. In one example, if the total payload cannot be accommodated in the available PUCCH resources according to $M_{RB}^{PUCCH}$ PRBs and code rate r, all or part of $O_{ACK,low}$ bits may need to be dropped. In an example, $O_{ACK,low}$ maybe partitioned into CBG level and/or per carrier and/or per carrier group. If all of $O_{ACK,low}$ bits cannot be multiplexed, HARQ-ACK bits corresponding to one or more CBGs of a carrier or a carrier group or one or more TBs of a carrier or a carrier group can be dropped. Partitions can be ordered according to CC index and/or CBG index to identify in which order bits are dropped.

In another embodiment, the code rate r may be based on the priority of codebook associated with the PUCCH resource configuration that is used for identifying the resource for transmission of the multiplexed HARQ-ACK. Moreover, value of r may be different depending on the multiplexing scenario. For example, there may be two values of maximum code rate configured for PUCCH resource configuration associated with high priority codebook, such as $r_{high-high}$ and $r_{high-low}$, may be used for multiplexing of HARQ-ACKs belonging to two different high priority codebooks and multiplexing of HARQ-ACKs belonging to low and high priority codebooks, respectively. Configured max code rate can be same or different depending on whether only low priority HARQ-ACK is multiplexed or other channels are multiplexed such SR and/or CSI, with or without low priority HARQ-ACK.

In another embodiment, CRC bits maybe separately appended for low and high priority HARQ-ACK bits. For example, if total payload including CRC bits ($O_{ACK,low}+O_{ACK,high}+O_{CRC}$), where $O_{CRC}$ bits maybe further divided into bits $O_{CRC-low}$ and $O_{CRC-high}$ bits corresponding to low and high priority HARQ-ACKs respectively, cannot satisfy the resource constraints for any valid PUCCH resource, part or all of $O_{ACK,low}$ bits may be dropped along with $O_{CRC-low}$ bits. For example, $O_{ACK,high}+O_{CRC-high}$ bits are transmitted only. In another example, $O_{ACK,low}$ are divided into two parts, such as $O_{ACK,low,part-1}$ and $O_{ACK,low,part-2}$. In this case, $O_{CRC}$ bits maybe further divided into two parts such as bits $O_{CRC-part1}$ and $O_{CRC-part2}$, where $O_{CRC-part1}$ is appended to the bits $O_{ACK,high}$ and $O_{ACK,low,part-1}$, whereas $O_{CRC-part2}$ is appended to $O_{ACK,low,part-2}$. Hence, if resource constraints are not satisfied, bits from $O_{ACK,low,part-2}$ are dropped only and $O_{ACK,low,part-1}$ can still be transmitted together with $O_{CRC-high}$ bits. To ensure increased spectral efficiency, finer granularity in selection of bits of $O_{ACK,low,part-2}$ can be considered, such as $O_{ACK,low,part-2}$ can be divided into N parts $O_{ACK,low,part-2}=\Sigma_{n=1}^{N} O_{ACK,low,part-2,n}$. When all of $O_{ACK,low,part-2}$ cannot be transmitted, one part is removed in each step to check whether the remaining parts can be transmitted until there is no parts left in $O_{ACK,low,part-2}$.

In one example, when CG-UCI bits are multiplexed with HARQ-ACK, CG-UCI bits are concatenated with HARQ-ACK bits before encoding and modulation in a similar manner described above.

Concatenation at RE Level

In one embodiment, $O_{ACK,low}$ and $O_{ACK,high}$ HARQ-ACK bits corresponding to low and high priority codebooks are encoded separately and mapped to separate REs within a qualified PUCCH resource. This approach may facilitate mapping high priority HARQ-ACK bits early in the PUCCH duration, thereby allowing early detection and ensuring lower latency. FIG. 3 shows a simple example where first symbol is allocated for mapping high priority HARQ-ACKs, whereas remaining symbols are used for transmitting low priority HARQ-ACKs. In one example, $\rho_j$ ($1-\rho_j$) fraction of resource j is allocated to $O_{ACK,high}$ ($O_{ACK,low}$) bits mapping, where $\rho_j \leq 1$. In another example, $\rho_j$ may be same for all PUCCH resources and $\rho_j$ can be configured by the network or derived from the $O_{ACK,low}$ and $O_{ACK,high}$. In one example, out of K symbols in PUCCH duration, $X \leq K$ symbols may be allocated for high priority HARQ-ACK transmission and K-X symbols are used for transmission of low priority HARQ-ACKs. As an extension to this example, X can be at the beginning of the PUCCH duration of K symbols.

In another embodiment, X or ρ may be based on the priority of codebook associated with the PUCCH resource configuration that is used for identifying the resource for transmission of the multiplexed HARQ-ACK. Moreover, value of X or ρ may be different depending on the multiplexing scenario. For example, there may be two values of X or ρ configured for PUCCH resource configuration associated with high priority codebook, such as $X_{high-high}$ or $\rho_{high-high}$ and $X_{high-low}$ or $\rho_{high-low}$ may be used for multiplexing of HARQ-ACKs belonging to two high priority codebooks and multiplexing of HARQ-ACKs belonging to low and high priority codebooks, respectively. Configured X or ρ can be same or different depending on whether only low priority HARQ-ACK is multiplexed or other channels are multiplexed such SR and/or CSI, with or without low priority HARQ-ACK. Maximum code rate r would apply to the identified resource of high and low priority HARQ-ACKs separately. In one example, maximum code rates for use in mapping HARQ-ACK bits of low and priority codebooks to corresponding resources can be implicitly obtained based on X or ρ. Alternatively, two maximum code rates can be configured for use in mapping low and high priority HARQ-ACK bits separately, and X or ρ can be implicitly obtained based on maximum code rates used.

In one example, when CG-UCI bits are multiplexed with HARQ-ACK, CG-UCI bits are concatenated with HARQ-ACK information at RE level in a similar manner described above. Same or different maximum code rates can be used for CG-UCI bits compared to code rates used for mapping HARQ-ACK bits to REs.

HARQ, SR, and/or CSI Multiplexing

In one embodiment, overlapping high priority (HP) HARQ-ACK and LP SR (positive SR) can only be multiplexed if the resultant PUCCH resource carrying multiplexed HARQ-ACK and SR ends at the same symbol as the PUCCH resource of HARQ-ACK, or alternatively PUCCH resource of HARQ-ACK can be used for multiplexing only if HARQ-ACK is HP. In one example, if a UE would transmit a PUCCH with LP positive SR and at most two HP HARQ-ACK information bits in a resource using PUCCH format 0, the UE transmits the PUCCH in the resource using PUCCH format 0 in PRB(s) for HARQ-ACK information. In another example, If the UE would transmit positive LP SR in a first resource using PUCCH format (PF) 1 and at most two HP HARQ-ACK information bits in a second resource using PUCCH format 1 in a slot, the UE transmits a PUCCH with HARQ-ACK information bits in the second resource using PUCCH format 1. In one embodiment, if HP HARQ-ACK uses PUCCH format X and LP SR uses PUCCH format Y, X=1, 2, 3, 4, Y=0,1, multiplexed UCI is transmitted using a resource using PUCCH format X if the determined PUCCH resource corresponding to PUCCH format X is suitable to carry the multiplexed UCI payload (here, the determination of the PUCCH resource is based on the total multiplexed payload to identify the PUCCH resource set when more than one PUCCH resource set is configured, and the PUCCH Resource Indicator (PRI) bit-field corresponding to the HARQ-ACK resource, otherwise LP SR is dropped—for example if HARQ-ACK is based on PUCCH format 2 but SR is using PUCCH format 1, multiplexed UCI is transmitted in PUCCH format 2 if the corresponding PUCCH resource for PUCCH format 2 can accommodate the multiplexed UCI payload, otherwise SR is dropped.

In another embodiment, if LP HARQ-ACK and HP SR overlaps, they can only be multiplexed if the resultant PUCCH resource carrying the multiplexed UCI ends at the same symbol as original PUCCH resource of HP (positive) SR. In particular, following behaviors, presented in Table 1 can be used if resources of HP SR and LP HARQ-ACK overlaps.

In one embodiment, for overlap of HP SR and LP CSI, (LP) HARQ-ACK in Table 1 can be replaced by CSI for the columns that include HARQ-ACKs with PFs 2, 3, 4. Further, when the resultant PUCCH resource is the (LP) HARQ-ACK (or CSI) resource, additional conditions may be imposed to determine whether to multiplex or drop the (LP) HARQ-ACK (or CSI). Some such conditions are elaborated in the sequel.

TABLE 1

| HP SR and LP HARQ-ACK multiplexing in PUCCH | | | | |
|---|---|---|---|---|
| | HARQ-ACK with PF0 | HARQ-ACK with PF1 | HARQ-ACK with PF2 | HARQ-ACK with PF3 or PF4 |
| SR with PF0 | Multiplexed UCI is transmitted using PF0 | Drop HARQ-ACK and transmit SR on SR resource | Multiplexed UCI is transmitted using PF 2 on HARQ-ACK resource or any other valid PUCCH resource based on PF 2 | Drop HARQ-ACK and transmit SR on the SR resource |
| SR with PF1 | Multiplexed UCI is transmitted using PF 0 or 1 | Multiplexed UCI is transmitted using PF 1 on SR or HARQ-ACK resource | | |

In one embodiment, when there is overlap of HP HARQ-ACK and CSI with or without SR, CSI is dropped. In another embodiment, when there is overlap of HP HARQ-ACK, LP SR and CSI, LP SR and CSI are multiplexed with HP HARQ-ACK when a valid PUCCH resource is determined based on the PRI and configured PUCCH resource sets for configured max code rate and total payload that ends no later than the last symbol of PUCCH resource of HARQ-ACK and/or CSI is using same PF as HARQ-ACK.

In one embodiment, a higher layer parameter can be provided to UE to determine whether to prioritize HP UCI(s) and drop LP UCI(s) or UE could multiplex the HP and LP UCIs into a resultant PUCCH resource when resources of LP and HP UCIs overlap according to resource (i.e., whether overall payload can be accommodated within a valid PUCCH resource) and timeline constraints (i.e., whether UCIs are available by the latest time before UE would start multiplexing the UCI).

In one embodiment, if UE supports multiplexing UCI with different priorities into PUCCH, and when UE determines there are more than two PUCCHs with UCIs of different priorities overlapping, UE transmits In one example, the jointly multiplexed UCI into a resultant PUCCH resource if the resource ends no later than the last symbol that is earliest among the last symbols of PUCCH resources carrying HP UCI, assuming timeline and resource constraint are satisfied for a given PFs according to configured max code rate. Otherwise, overlapping LP channels such as LP HARQ-ACK and/or LP SR and/or CSI are dropped.

In another example, UE multiplexes according to the following priority order:
HP UCIs are considered for multiplexing first, such as HP HARQ-ACK and HP SR LP UCI payload can be added to payloads of HP UCIs if resource constraints can be satisfied for configured max code rate among the available PUCCH resources for a given PF.

Among the LP UCIs, LP HARQ-ACK and LP SR are prioritized over LP CSI

In another example, UE only multiplexes up to three UCIs

For example, if HP and LP HARQ-ACKs overlap with LP SR and CSI, UE may attempt to multiplex up to three of them, such as UE may multiplex HP and LP HARQ-ACK with SR and drop CSI.

Note that if UE supports construction of two codebooks, one for HP and another for LP HARQ-ACK, PUCCH configurations for two simultaneously constructed HARQ-ACK codebooks can be provided in higher layer parameter or IE pucch-ConfigurationList. Different PUCCH Resource IDs are configured in different PUCCH configurations PUCCH-Config within the pucch-ConfigurationList if configured. In one example, if overlapping channels include HP HARQ-ACK, PUCCH config associated with HP HARQ-ACK codebook is used for multiplexing the UCIs, which may include UCI of different priorities, into a PUCCH resource and only the PUCCH resource IDs within that PUCCH config is considered for multiplexing according to the max code rate configured for different PFs.

DAI Mechanism

NR uses the downlink assignment index (DAI) included in the DCI containing the downlink assignment. The DAI field is further split into two parts, a counter DAI (cDAI) and, in the case of carrier aggregation, a total DAI (tDAI). The counter DAI included in the DCI indicates the number of scheduled downlink transmissions up to the point the DCI was received in a carrier first, time second manner. The total DAI included in the DCI indicates the total number of downlink transmissions across all carriers up to this point in time, e.g., the highest cDAI at the current point in time. For example, two bits can be used for each and the numbering will wrap around, e.g., signaled as modulo 4.

In one embodiment, UE would maintain separate DAI counting for the codebooks used. In other words, the codepoint indicated in the DAI field would correspond to the indicated codebook to be used for HARQ-ACK transmission.

In another embodiment, UE may adjust DAI counting of low priority, e.g., first codebook based on whether it is later multiplexed with high priority second codebook and multiplexed HARQ-ACKs are transmitted based on PUCCH resource configuration associated with second codebook. In one example, UE readjusts to the DAI values for the first codebook that was valid prior to receiving first DCI when UE identifies low priority HARQ-ACKs are not be transmitted separately rather than to be multiplexed with high priority HARQ-ACKs. For example, according to FIG. 2, UE readjusts DAI counting for the codebook signaled to be used for transmission of first HARQ-ACK bits. In this case, DAI values of second codebook is updated taking into consideration that both low and high priority HARQ-ACKs are multiplexed using the configuration of second codebook. Alternatively, UE does not readjust and keeps counting DAI for two codebooks separately even if they are multiplexed and transmitted using a common PUCCH resource based on PUCCH configuration of one of the codebooks, such as high priority codebook.

Timeline Aspects

In one embodiment, If a UE detects a first DCI format indicating a first resource for a PUCCH transmission with corresponding HARQ-ACK information associated with a codebook of priority index=0 (low priority) in a first slot or a first sub-slot and also detects at a later time a second DCI format indicating a second resource for a PUCCH transmission with corresponding HARQ-ACK information associated with a codebook of priority index=1 (high priority) in the first slot or in the first sub-slot or in a second sub-slot that overlaps with the first slot, the UE does not expect to multiplex HARQ-ACK information corresponding to the second DCI format in a PUCCH resource in the slot if the PDCCH reception that includes the second DCI format is not earlier than $N_3 \cdot (2048+144) \cdot \kappa \cdot 2^{-\mu} \cdot T_C$ from the beginning of a first symbol of the first resource for PUCCH transmission in the first slot or first sub-slot where, $\kappa$ and $T_c$ are defined in clause 4.1 of [1] and $\mu$ corresponds to the smallest SCS configuration among the SCS configurations of the PDCCHs providing the DCI formats and the SCS configuration of the PUCCH. $N_3$ is based on UE processing capability. For example, if increased processing capability such as processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$, for $\mu=1$, $N_3=17$ for $\mu=2$, $N_3=20$ for $\mu=3$.

Collision of Low priority DG PUSCH and high priority CG PUSCH

If the prioritization between low priority (LP) DG and high priority (HP) CG PUSCH is performed in MAC, then such CG-DG overlaps can be supported. For this, it is necessary that the MAC PDU for the HP CG PUSCH is available from the multiplexing and assembly entity at least Tproc,2+d1 before the start of the LP DG PUSCH, and thus MAC will ignore the LP DG PUSCH UL grant.

If the prioritization between LP DG and HP CG PUSCH is performed in PHY, it may not be feasible with cancelation timelines we have agreed so far since the triggering of the transmission of the HP CG PUSCH would be dependent on when the MAC delivers the corresponding MAC PDU to PHY for the HP CG PUSCH. However, establishing a timeline for such a trigger in PHY specs may not be feasible. On the other hand, the UE would still need some minimum time to cancel the LP DG PUSCH. From RAN 1 spec perspective, it may not be possible to guarantee that the UE can perform the cancelation of the DG PUSCH in the PHY (although it is aware of the CG PUSCH occasion a priori) if it receives the transport block from MAC such that it still has Tproc,2+d1 time to cancel the DG PUSCH at least latest from the first overlapping symbol.

Figure 4:
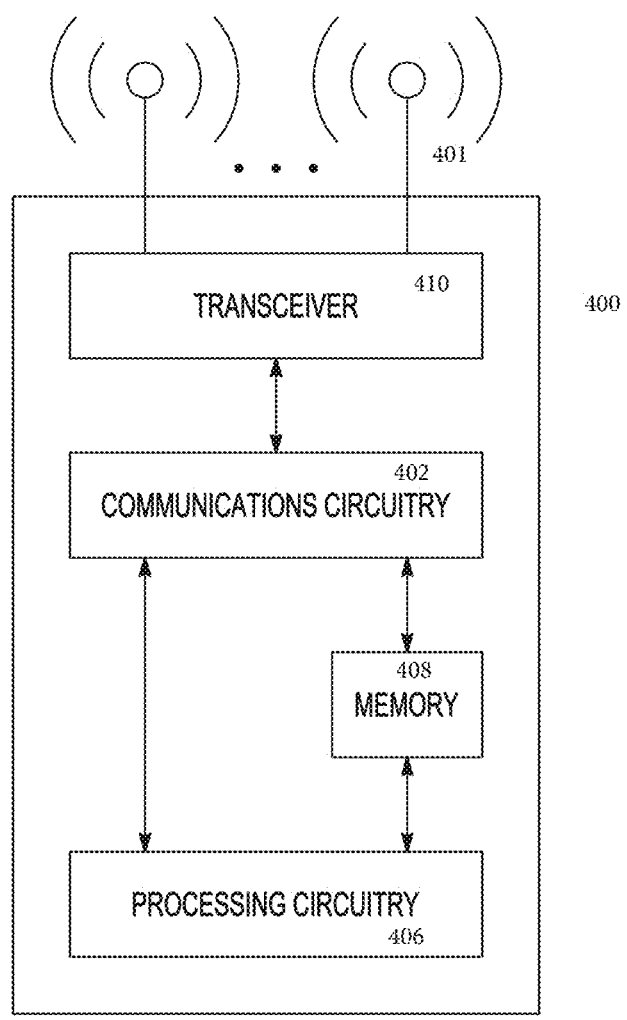
FIG. 4 illustrates a function block diagram of a wireless communication device in accordance with some embodiments.

FIG. 4 illustrates a function block diagram of a wireless communication device in accordance with some embodiments. In one embodiment, FIG. 4 illustrates a functional block diagram of a user equipment (UE) or other user device in accordance with some embodiments. In one embodiment, FIG. 4 illustrates a functional block diagram of a generation node B (gNB). The communication device 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication device 400 may include communications circuitry 402 and a transceiver 410 for transmitting and receiving signals to and from other communication devices using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication device 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication device 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 400 may include one or more of a keyboard, a display, a non-volatile memory port, multiple antennas, a graphics processor, an application processor, speakers, and other mobile device elements. The display may be an LCD screen including a touch screen.

Although the communication device 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 400 may refer to one or more processes operating on one or more processing elements.

EXAMPLES

Example 1 may include a method of a UE performing an NR wireless communication, the method comprising:
    receiving configuration of a first HARQ-ACK codebook associated with a low priority;
    receiving configuration of a second HARQ-ACK codebook associated with a high priority;
    receiving by the UE, a first indication for first PDSCH transmission, where the first indication is to indicate that a corresponding HARQ-ACK transmission is to be based on the first codebook and is to made in a first PUCCH resource;
    receiving by the UE, a second indication for a second PDSCH transmission, where the second indication is to indicate that a corresponding HARQ-ACK transmission is to be based on the second codebook and is to be made in a second PUCCH resource that overlaps with the first PUCCH resource; and
    transmitting by the UE, multiplexed HARQ-ACK based on two codebooks in a third PUCCH resource based on the configuration of the second HARQ-ACK codebook.

Example 2 may include the method of example 1 or some other example herein, where at least second HARQ-ACK codebook is type-2 (for example, dynamic) codebook.

Example 3 may include the method of example 1 or some other example herein, where the first and second indications are provided in DL scheduling DCIs, such as, DCI formats 1_1 or 1_2.

Example 4 may include the method of example 1 or some other example herein, wherein the second indication is received after the first indication.

Example 5 may include the method of example 1 or some other example herein, where the third PUCCH resource ends no later than a last symbol of the second PUCCH resource.

Example 6 may include the method of example 1 or some other example herein, where bits of HARQ-ACKs corresponding to the first and second codebooks are concatenated before encoding and modulation.

Example 7 may include a method of operating a UE, the method comprising:
    receiving configuration information to configure HARQ-ACK for first and second priorities;
    receiving scheduling information that schedules first HARQ-ACK feedback, which is associated with the first priority, to be transmitted in first PUCCH resources and schedules second HARQ-ACK feedback, which is associated with the second priority, to be transmitted in second PUCCH resources, wherein the first priority is different from the second priority; and
    multiplexing the first and second HARQ-ACK feedback.

Example 7.1 may include the method of example 7 or some other example herein, wherein the first and second PUCCH resources are at least partially overlapping.

Example 7.2 may include the method of example 7 or some other example herein, wherein multiplexing or encoding of the first and second HARQ-ACK feedback is based on one or more of the two codebooks.

Example 8 may include the method of example 7 or some other example herein, wherein the configuration information is to configure a first codebook for first priority and to configure a second codebook for a second priority.

Example 8.1 may include the method of example 8 or some other example herein, further comprising: receiving, in a field in a DCI format providing DL scheduling grant for a PDSCH, an indication of which codebook to use of the first and second codebooks for a HARQ transmission corresponding to the PDSCH.

Example 8.2 may include the method of example 8 or some other example herein, further comprising: receiving, by higher layer signaling (e.g., MAC or RRC signaling), an indication of which codebook to use of the first and second codebooks for a HARQ transmission corresponding to an SPS-PDSCH.

Example 9 may include the method of example 8 or some other example herein, further comprising: transmitting the multiplexed first and second HARQ feedback based on the first codebook.

Example 10 may include the method of example 8 or some other example herein, wherein the first and second codebooks are slot based codebooks or sub-slot based codebooks (e.g., PUCCH resource for a HARQ transmission spans a slot or sub-slot, respectively).

Example 11 may include the method of example 7 or some other example herein, wherein the configuration information is to configure a plurality of PUCCH resource sets for transmission of HARQ-ACK information.

Example 12 may include the method of example 11 or some other example herein, wherein individual PUCCH resource sets include a number of PUCCH resources with individual PUCCH resources corresponding to a PUCCH format, a first symbol, a duration, a PRB offset, and a cyclic shift index set for a PUCCH transmission.

Example 13 may include the method of example 7 or some other example herein, further comprising: encoding the multiplexed first and second HARQ feedback with a Reed-muller code or a polar code.

Example 14 may include the method of example 7 or some other example herein, further comprising: transmitting an indication of a capability of the UE to multiplex HARQ-ACK feedback based on two codebooks.

Example 15 may include the method of example 14 or some other example herein, further comprising: receiving higher-layer signaling/parameter to indicate the UE is to allow multiplexing of two HARQ-ACK codebooks of different priorities.

Example 16 may include the method of example 7 or some other example herein, further comprising: multiplexing the first and second HARQ-ACK feedback utilizing feedback parameters associated with a HARQ-ACK feedback having a higher priority of the two.

Example 17 may include the method of example 7 or some other example herein, further comprising: transmitting the multiplexed first and second HARQ information in third PUCCH resources.

Example 18 may include the method of example 17 or some other example herein, wherein the third PUCCH resources is at least partially overlapping, in time and frequency, with the first or second PUCCH resources.

Example 19 may include the method of example 17 or some other example herein, wherein the third PUCCH resource is obtained based on a configuration of a codebook of the first and second codebook that can have a varying payload size of HARQ-ACK bits.

Example 20 may include the method of example 7 or some other example herein, further comprising: concatenating HARQ-ACK bits of the first and second HARQ-ACK feedback in a bit domain before encoding according to a PUCCH format. transmitting the multiplexed first and second HARQ information in third PUCCH resources.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation system (5GS), the apparatus comprising: processing circuitry; and memory,
   wherein the processing circuitry is configured to:
   decode radio-resource control (RRC) configuration information to configure the UE with a first hybrid-automatic repeat request (HARQ) acknowledgement (ACK) (HARQ-ACK) codebook for first priority HARQ-ACK bits and configure the UE with a second HARQ-ACK codebook for second priority HARQ-ACK bits,
   the configuration information indicating a first physical uplink control channel (PUCCH) configuration for a first PUCCH resource for the first HARQ-ACK codebook and a second PUCCH configuration for a second PUCCH resource for the second HARQ-ACK codebook; and
   multiplex the first priority HARQ-ACK bits and the second priority HARQ-ACK bits in a PUCCH transmission when the first and second PUCCH resources overlap in time,
   wherein the processing circuitry is configured to select a resultant PUCCH resource based on the second PUCCH configuration to multiplex the first priority HARQ-ACK bits and the second priority HARQ-ACK bits when the second priority has a priority index of one and the first priority has a priority index of zero,
   wherein when the second PUCCH resource configuration is sub-slot based and the second PUCCH resource has a duration of less than a slot, the resultant PUCCH resource is selected to at least one of:
   extend in time beyond the second PUCCH resource to a sub-slot boundary within a slot that includes the second PUCCH resource when the second PUCCH resource ends before the sub-slot boundary; and
   extend in frequency beyond a frequency of the second PUCCH resource within the slot,
   wherein the memory is configured to store the configuration information.

2. The apparatus of claim 1, wherein the first priority with the priority index of zero is a low priority (LP) and the second priority with the priority index of one is a high priority (HP).

3. The apparatus of claim 2, wherein the configuration information includes a priority index '0' to indicate the first priority and a priority index '1' to indicate the second priority.

4. The apparatus of claim 3, wherein when the first PUCCH resource for the first HARQ-ACK codebook overlaps in time with the second PUCCH resource for the second HARQ-ACK codebook, the processing circuitry is configured to separately encode the first priority HARQ-ACK bits and the second priority HARQ-ACK bits for multiplexing in the resultant PUCCH resource when the second priority is a higher priority than the first priority.

5. The apparatus of claim 4, wherein when the first PUCCH resource for the first HARQ-ACK codebook does not overlap in time with the second PUCCH resource for the second HARQ-ACK codebook, the processing circuitry is configured to refrain from multiplexing the first priority HARQ-ACK bits and the second priority HARQ-ACK bits in any of the PUCCH resources.

6. The apparatus of claim 4, wherein the processing circuitry is configured to:
decode a first physical downlink shared channel (PDSCH);
decode a second PDSCH;
generate the first priority HARQ-ACK bits based on the decoding of the first PDSCH; and
generate the second priority HARQ-ACK bits based on the decoding of the second PDSCH.

7. The apparatus of claim 6, wherein the processing circuitry is configured to decode a downlink (DL) scheduling downlink control information (DCI) format, the DCI format including a field to indicate whether to enable or disable HARQ-ACK codebook multiplexing.

8. The apparatus of claim 6, wherein the first priority with the priority index of zero is a lower priority than the second priority with the priority index of one.

9. The apparatus of claim 6, wherein the second priority with the priority index of one is a higher priority than the first priority with the priority index of zero.

10. The apparatus of claim 4, wherein when the first PUCCH resource for the first HARQ-ACK codebook overlaps with the second PUCCH resource for the second HARQ-ACK codebook, to multiplex the first priority HARQ-ACK bits and the second priority HARQ-ACK bits when the second priority is a higher priority than the first priority, the processing circuitry is configured to encode the second priority HARQ-ACK bits for transmission in a first portion of the resultant PUCCH resource and encode the first priority HARQ-ACK bits for transmission in a second portion of the resultant PUCCH resource.

11. The apparatus of claim 4, wherein the processing circuitry comprises a baseband processor and is configured to:
decode first data received via a first physical downlink shared channel (PDSCH);
decode second data received via a second PDSCH;
generate the first priority HARQ-ACK bits based on the decoding of the first data; and
generate the second priority HARQ-ACK bits based on the decoding of the second data.

12. A non-transitory computer-readable storage medium that stores instructions for execution by processing circuitry of a user equipment (UE) configured for operation in a fifth-generation system (5GS),
wherein the processing circuitry is configured to:
decode radio-resource control (RRC) configuration information to configure the UE with a first hybrid-automatic repeat request (HARQ) acknowledgement (ACK) (HARQ-ACK) codebook for first priority HARQ-ACK bits and configure the UE with a second HARQ-ACK codebook for second priority HARQ-ACK bits,
the configuration information indicating a first physical uplink control channel (PUCCH) configuration for a first PUCCH resource for the first HARQ-ACK codebook and a second PUCCH configuration for a second PUCCH resource for the second HARQ-ACK codebook; and
multiplex the first priority HARQ-ACK bits and the second priority HARQ-ACK bits in a PUCCH transmission when the first and second PUCCH resources,
wherein the processing circuitry is configured to select a resultant PUCCH resource based on the second PUCCH configuration to multiplex the first priority HARQ-ACK bits and the second priority HARQ-ACK bits when the second priority has a priority index of one and the first priority has a priority index of zero,
wherein when the second PUCCH resource configuration is sub-slot based and the second PUCCH resource has a duration of less than a slot, the resultant PUCCH resource is selected to at least one of:
extend in time beyond the second PUCCH resource to a sub-slot boundary within a slot that includes the second PUCCH resource when the second PUCCH resource ends before the sub-slot boundary; and
extend in frequency beyond a frequency of the second PUCCH resource within the slot.

13. The non-transitory computer-readable storage medium of claim 12, wherein the first priority with the priority index of zero is a low priority (LP) and the second priority with the priority index of one is a high priority (HP).

14. The non-transitory computer-readable storage medium of claim 13, wherein the configuration information includes a priority index '0' to indicate the first priority and a priority index '1' to indicate the second priority.

15. The non-transitory computer-readable storage medium of claim 14, wherein when the first PUCCH resource overlaps in time with the second PUCCH resource, the processing circuitry is configured to separately encode the first priority HARQ-ACK bits and the second priority HARQ-ACK bits for multiplexing in the resultant PUCCH resource.

16. The non-transitory computer-readable storage medium of claim 15, wherein when the first PUCCH resource does not overlap in time with the second PUCCH resource, the processing circuitry is configured to refrain from multiplexing the first priority HARQ-ACK bits and the second priority HARQ-ACK bits in any of the PUCCH resources.

17. The non-transitory computer-readable storage medium of claim 15, wherein the processing circuitry is configured to:
decode a first physical downlink shared channel (PDSCH);
decode a second PDSCH;
generate the first priority HARQ-ACK bits based on the decoding of the first PDSCH; and
generate the second priority HARQ-ACK bits based on the decoding of the second PDSCH.

18. The non-transitory computer-readable storage medium of claim 17, wherein the processing circuitry is configured to decode a downlink (DL) scheduling downlink control information (DCI) format, the DCI format including a field to indicate whether to enable or disable HARQ-ACK codebook multiplexing.

19. The non-transitory computer-readable storage medium of claim 17, wherein the first priority with the priority index of zero is a lower priority than the second priority with the priority index of one.

20. The non-transitory computer-readable storage medium of claim 17, wherein the second priority with the priority index of one is a higher priority than the first priority with the priority index of zero.

21. The non-transitory computer-readable storage medium of claim 15, wherein when the first PUCCH resource overlaps with the second PUCCH resource, to multiplex the first priority HARQ-ACK bits and the second priority HARQ-ACK bits when the second priority is a higher priority than the first priority, the processing circuitry is configured to encode the second priority HARQ-ACK bits for transmission in a first portion of the resultant PUCCH resource and encode the first priority HARQ-ACK bits for transmission in a second portion of the resultant PUCCH resource.

22. The non-transitory computer-readable storage medium of claim 15, wherein the processing circuitry comprises a baseband processor and is configured to:
decode first data receive via a first physical downlink shared channel (PDSCH);
decode second data received via a second PDSCH;
generate the first priority HARQ-ACK bits based on the decoding of the first data; and
generate the second priority HARQ-ACK bits based on the decoding of the second data.

23. An apparatus of a generation node B (gNB) configured for operation in a fifth-generation system (5GS), the apparatus comprising: processing circuitry; and memory,
wherein the processing circuitry is configured to:
encode radio-resource control (RRC) configuration information to configure a user equipment (UE) with a first hybrid-automatic repeat request (HARQ) acknowledgement (ACK) (HARQ-ACK) codebook for first priority HARQ-ACK bits and to configure the UE with a second HARQ-ACK codebook for second priority HARQ-ACK bits, the configuration information indicating a first physical uplink control channel (PUCCH) configuration for a first PUCCH resource for the first HARQ-ACK codebook and a second PUCCH configuration for a second PUCCH resource for the second HARQ-ACK codebook;
decode a PUCCH transmission comprising the first priority HARQ-ACK bits and the second priority HARQ-ACK bits, the first priority HARQ-ACK bits and the second priority HARQ-ACK bits multiplexed in the PUCCH transmission when the first and second PUCCH resources overlap in time,
wherein the processing circuitry is configured to decode the PUCCH transmission received on a resultant PUCCH resource based on the second PUCCH configuration when the second priority has a priority index of one and the first priority has a priority index of zero,
wherein when the second PUCCH resource configuration is sub-slot based and the second PUCCH resource has a duration of less than a slot, the resultant PUCCH resource is at least one of:
extended in time beyond the second PUCCH resource to a sub-slot boundary within a slot that includes the second PUCCH resource when the second PUCCH resource ends before the sub-slot boundary; and
extended in frequency beyond a frequency of the second PUCCH resource within the slot, and
wherein the memory is configured to store the configuration information.

24. The apparatus of claim 23, wherein when the first PUCCH resource overlaps in time with the second PUCCH resource, the processing circuitry is configured to separately decode the first priority HARQ-ACK bits and the second priority HARQ-ACK bits that are multiplexed in the resultant PUCCH resource when the second priority is a higher priority than the first priority.

25. The apparatus of claim 24, wherein the processing circuitry is configured to:
encode a first physical downlink shared channel (PDSCH) for transmission to the UE; and
encode a second PDSCH for transmission to the UE,
wherein the first priority HARQ-ACK bits are based on the decoding of the first PDSCH by the UE, and
wherein the second priority HARQ-ACK bits are based on the decoding of the second PDSCH by the UE.

* * * * *

UNITED STATES PATENT AND TRADEMARK OFFICE
CERTIFICATE OF CORRECTION

| | |
|---|---|
| PATENT NO. | : 11,888,592 B2 |
| APPLICATION NO. | : 17/243773 |
| DATED | : January 30, 2024 |
| INVENTOR(S) | : Islam et al. |

Page 1 of 1

It is certified that error appears in the above-identified patent and that said Letters Patent is hereby corrected as shown below:

On the Title Page

In item (65), in "Prior Publications Data", in Column 1, Line 1, after "Aug. 12, 2021", insert --¶Related U.S. Application Data
(60) Provisional application No. 63/019,059, filed on May 1, 2020, provisional application No. 63/063,107, filed on Aug. 7, 2020.--

Item (57) in "Abstract", in Column 2, Line 1, delete "(LTE)" and insert --(UE)-- therefor Item (57) in "Abstract", in Column 2, Line 14, delete "LTE" and insert --UE-- therefor Signed and Sealed this
Eighteenth Day of March, 2025

Coke Morgan Stewart
*Acting Director of the United States Patent and Trademark Office*